INVENTOR.
HAROLD E. ELLER

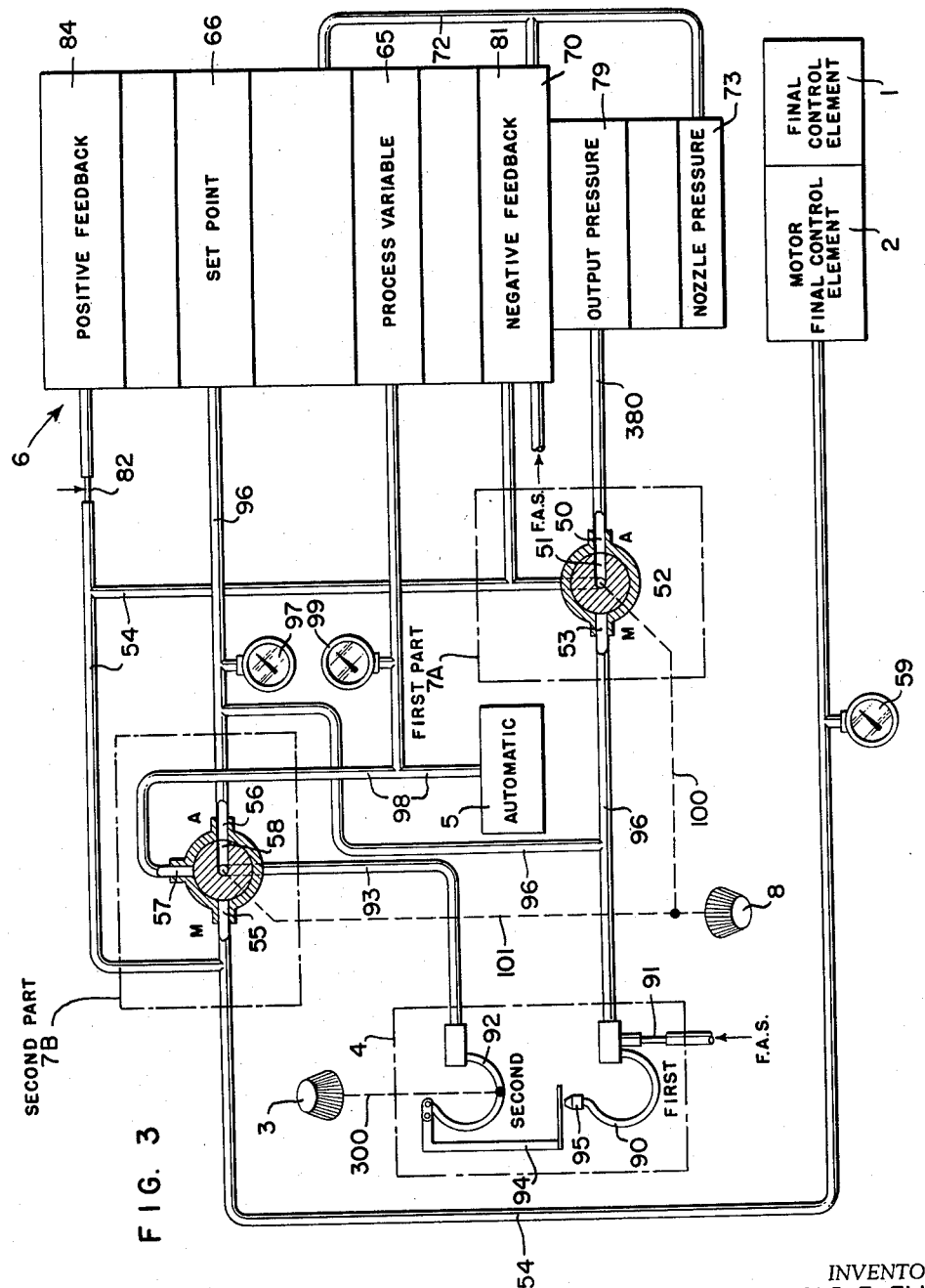

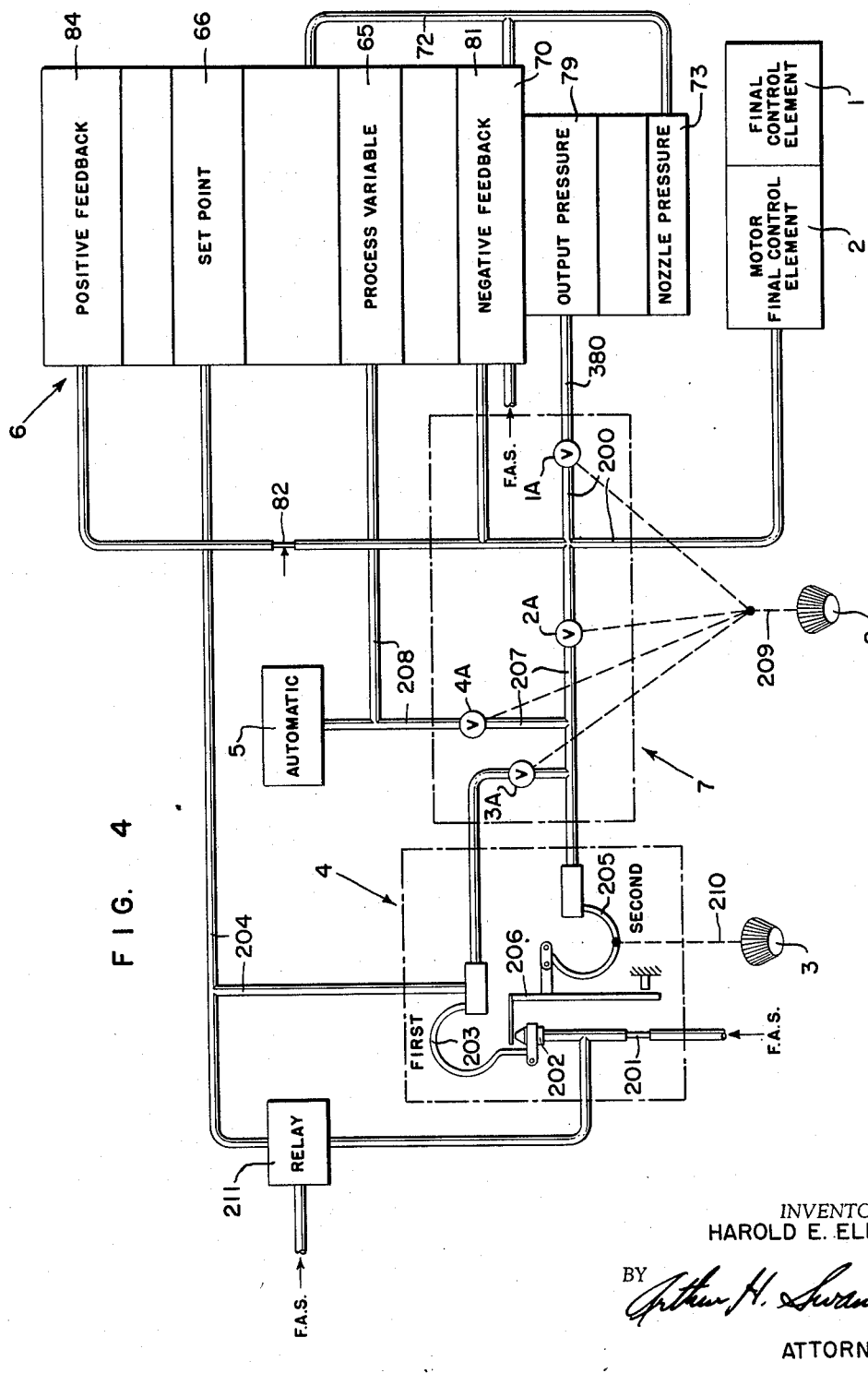

United States Patent Office 2,939,472
Patented June 7, 1960

2,939,472

AIR-PRESSURE-OPERATED AUTOMATICALLY OR MANUALLY ACTUATED CONTROLLER

Harold E. Eller, El Paso, Tex., assignor to Minneapolis-Honeywell Regulator Company, Minneapolis, Minn., a corporation of Delaware Filed Jan. 17, 1956, Ser. No. 559,587

3 Claims. (Cl. 137—82)

Air-powered apparatus for operating industrial processes is well known. Such apparatus includes: a final control element such as a valve, which governs the supply of fuel or other control agent to the process; a manually operable means for actuating this final control valve; and an automatically operable means for actuating this final control valve. This automatically operable means includes: a measuring instrument responsive to the controlled variable of the process; and a controller which actuates the final control valve automatically in response to the variations in this controlled variable.

It is an object of this invention to provide means for shifting control of the final control element from the manually operable means to the automatically operable means or vice versa without a disturbance or "bump" in the process under control.

It is a further object of this invention to avoid the limitations of the devices known to the prior art in which transfer of control of a final control valve from a manually operable device to an automatically operable device or vice versa required the operator to observe gauges indicating the pressure applied to the final control valve at that instant and the pressure about to be applied to the final control valve, to note when these pressures were equal or substantially equal, and to then actuate a transfer valve to effect the transfer of control.

More specifically, it is an object of this invention to provide an air-operated apparatus having means for manually or automatically actuating a final control element in which there is a transfer valve and a transmitter-receiver so interlocked that the transfer of control of the final control element from the manual actuator to the automatic actuator or vice versa can be made without a disturbance or "bump" to the process under control.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Fig. 3 is a diagram of a modified form of pneumatic circuit;

Fig. 4 is a diagram of a second modified form of pneumatic circuit.

FIG. 1

Figure 1:
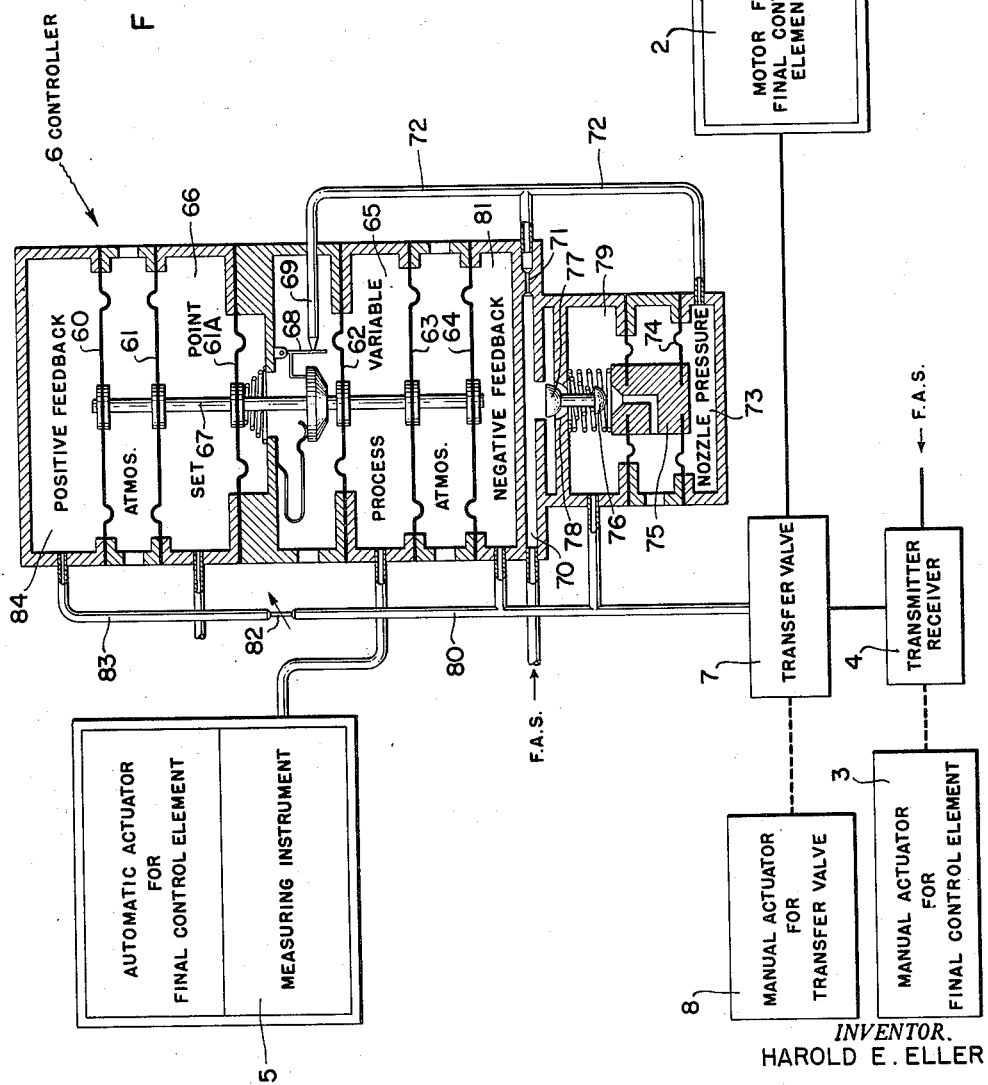
Fig. 1 is a block diagram with the controller shown in schematic or diagrammatic cross section.

Fig. 1 is a block diagram of apparatus for operating an industrial process. The device of Fig. 1 is illustrated here to show the construction of the controller. Such apparatus includes a final control element 1 which may be, for example, a valve controlling the supply of fuel to a burner. A motor 2 is provided for actuating the final control element 1. In air-operated apparatus such a motor may be, for example, a diaphragm stressed by a variable air pressure in one direction and by a spring in the opposite direction. Such final control elements and such air-operated motors are well known in the art and are therefore not illustrated in detail herein.

Final control element 1 or, more specifically, motor 2 for actuating element 1, may be actuated either automatically or manually.

Such a manual actuator may comprise a valve controlling the pressure of air from a source of compressed air. In the embodiment shown, the manual actuator 3 includes a handle which actuates one of the motors of a transmitter-receiver 4 described in greater detail hereinafter.

The automatic actuator for the final control element includes a measuring instrument 5. There are many such measuring instruments known to the art for measuring a great variety of variables which are used in the control of industrial processes. Such measuring instruments providing a variable output air pressure are well known and commercially available and are not illustrated herein. An example of such a measuring instrument is to be found in U.S. Patent 2,311,853, patented February 23, 1943, to C. B. Moore. For brevity, the air under pressure in the various pipes and chambers of controller 6 is referred to simply as a pressure. Such a pressure is often identified by a suitable designation, e.g. output pressure.

The output pressure of measuring instrument 5 is usually fed to a controller, generally indicated at 6. Controller 6 comprises a casing divided by diaphragms 60, 61, 61A, 62, 63, and 64 into a plurality of chambers. Chamber 65 is a process variable pressure chamber to which the output pressure from the measuring instrument 5 is fed. Chamber 66 is a set point pressure chamber to which chamber a pressure is supplied which pressure is manually changed so as to represent a set point or datum value of the variable to which the measuring instrument responds. The pressure in process variable chamber 65 opposes the pressure in set point chamber 66. Therefore, the controller 6 will sense any deviation from this set point pressure and will respond to it. Diaphragms 60, 61, 61A, 62, 63, and 64 are each connected at the movable, central portion thereof to a shaft 67 which actuates a small valve or flapper 68 relative to a nozzle 69 so as to vary the air pressure which escapes through the nozzle 69. The controller 6 is connected to a supply of air under pressure. This supply may be a filtered air supply and is marked F.A.S. Inlet chamber 70 is connected by a restriction 71 and a pipe 72 to nozzle 69. Nozzle 69 and restriction 71 are connected by conduit 72 to a relay chamber 73, one wall of which is formed by a movable diaphragm 74. Connected to movable wall or diaphragm 74 is a perforated exhaust valve 75. One end of the perforation through exhaust valve 75 is opened or closed by a semi-circular valve element 76 connected to a valve element 77 which cooperates with a valve seat 78. Valve elements 77 and 78 form an inlet valve from inlet chamber 70 to an output pressure chamber 79. Valve elements 75 and 76 form an exhaust valve from output pressure chamber 79.

If the pressure in process variable chamber 65 varies from the pressure in set point pressure chamber 66, shaft 67 causes flapper 68 to move relative to nozzle 69 and thereby to vary the pressure of the air passing from source F.A.S. through restriction 71 and pipe 72 to chamber 73. Variation in the pressure in chamber 73 causes diaphragm 74 to move, either in the direction to cause valve elements 77 and 78 to admit air from source F.A.S. and inlet chamber 70 to output pressure chamber 79, or in the direction to exhaust air from output pressure chamber 79.

The output pressure from chamber 79 is fed to conduit 80 so as to form the output pressure of the controller. Conduit 80 connects directly with chamber 81. The pressure in chamber 81 opposes the pressure in process variable chamber 65. Chamber 81 is therefore known as the negative feedback pressure chamber. Conduit 80 further connects with a restriction 82 and a conduit 83 which connects with a chamber 84. The pressure in chamber 84 acts in the same direction as the pressure in process variable chamber 65. Chamber 84 is therefore known as the positive feed-back chamber.

The output conduit 80 connects to the transfer valve, generally indicated at 7. As will be seen hereinafter, this transfer valve comprises a number of parts. These parts may be moved by a manual actuator 8 for the transfer valve 7.

FIG. 2

Figure 2:
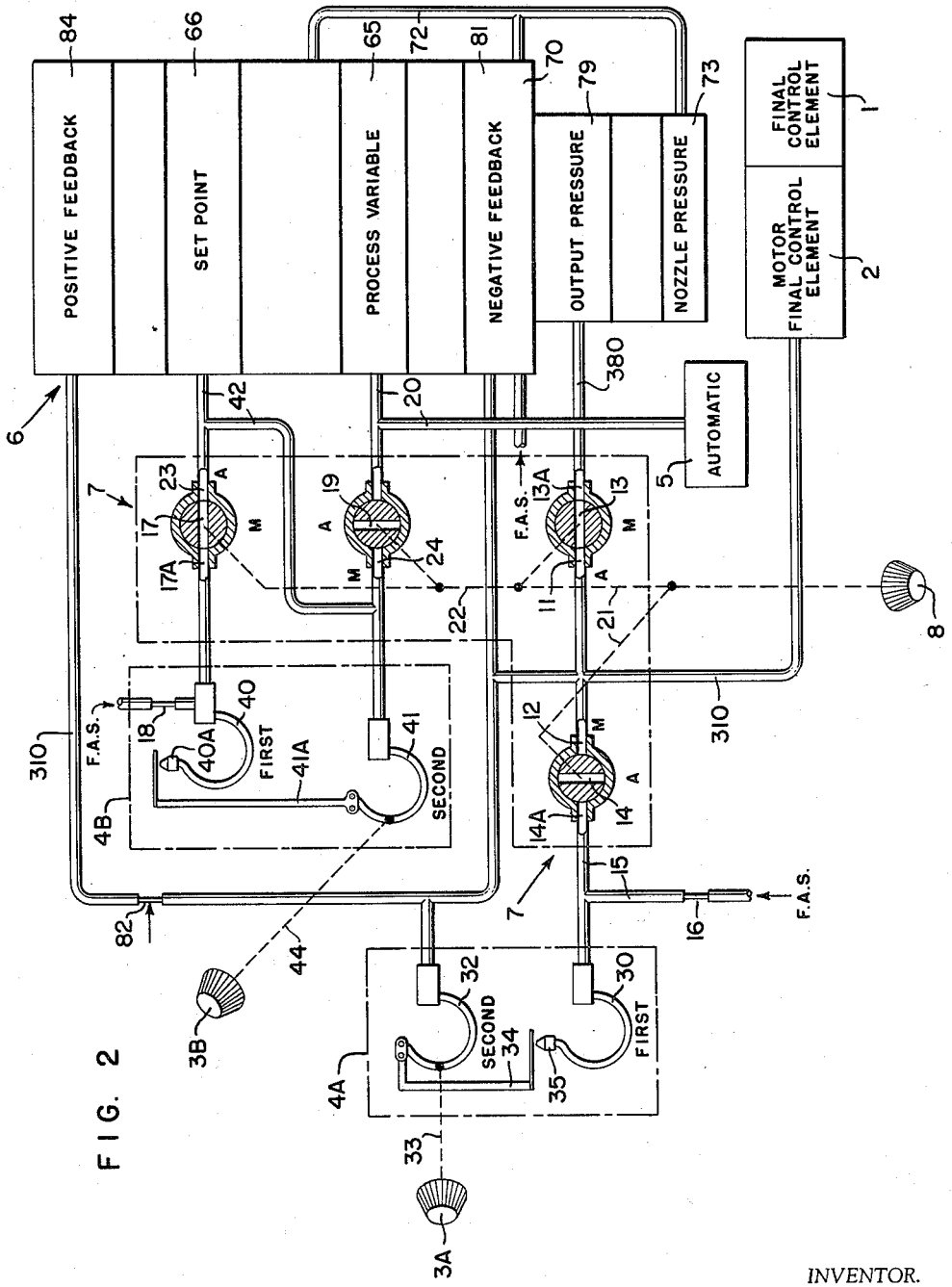
Fig. 2 is a diagram of a pneumatic circuit.

Fig. 2 is a diagram of an air-operated circuit in which the solid lines show pipes or conduits for conducting air while the lines comprised of single dashes show mechanical connections for actuating various parts. Controller 6 is disclosed in detail in Fig. 1 and therefore is disclosed in schematic or diagrammatic form in Fig. 2. In Fig. 2, the elements constituting the transfer valve are enclosed within the dash-and-dot line generally designated 7.

The motor 2 of the final control element 1 is connected by pipe 310 to the negative feed-back chamber 81 and through restriction 82 to the positive feed-back chamber 84 of controller 6. Conduit 310 also connects to a stationary conduit 11 forming part of the transfer valve 7 and to another stationary conduit 12, also forming part of the transfer valve 7. The stationary valve conduits 11 and 12 and all the stationary valve conduits mentioned hereinafter are designated in Figs. 2 and 3 as parts of plug valves. None of the stationary valve conduits as shown in Figs. 2, 3, or 4 communicate with the atmosphere except when connected to one of the nozzles, such as nozzle 35. The output chamber 79 of controller 6 is marked in Fig. 2 with the legend "Output Pressure" and is connected by pipe 380 to a stationary valve conduit 13A. Movable valve conduit 13 may be turned about its pivot so as to engage stationary valve conduits 11 and 13A, when the device is in automatic position, or may be moved out of engagement with the stationary valve conduits 11 and 13A, when the device is in manual position. In Figs. 2 and 3 the transfer valve 7 is shown in automatic position. The movable valve conduits, such as conduit 13, are shown in automatic position and connected with one or more stationary valve conduits or positions of the movable valve plugs indicated by A. The position of each of the movable valve conduits, such as conduit 13, in manual position, is marked by M. Transfer valve 7 also includes a second movable valve conduit 14 which communicates by means of its stationary valve conduit 14A and pipe 15 and restriction 16 with a filtered air supply F.A.S. The transfer valve 7 also includes a third movable valve conduit 17 and a stationary valve conduit 17A which is connected through restriction 18 to a filtered air supply F.A.S. Transfer valve 7 also includes a fourth movable valve conduit 19 connected through conduit 20 to the measuring instrument 5, which is marked in Fig. 2 with the legend "Automatic." Conduit 20 also communicates with the process variable chamber 65 of the controller 6, which chamber is marked in Fig. 2 with the legend "Process Variable."

The manual actuator 8 for the transfer valve 7 is connected by a mechanical connection 22 with the movable valve conduits 19 and 17 and by a mechanical connection 21 with the movable valve conduits 13 and 14. It will be seen that manual actuator 8 can be moved by an operator so as to engage movable valve conduit 13 with stationary valve conduit 11; so as to engage movable valve conduit 14 with stationary valve conduit 12; so as to move movable valve conduit 17 so as to engage stationary valve conduit 23; so as to cause movable valve conduit 19 to engage stationary valve conduit 24; or to disengage said movable valve conduits from said stationary valve conduits. In each case, the location of the movable valve conduit in automatic position is marked with an A and the position of the movable valve conduit in manual position is marked with an M.

The transmitter-receiver 4 of Fig. 1 is duplicated at 4A and 4B in the modification shown in Fig. 2. This transmitter-receiver is the subject matter of joint application S.N. 502,702; filed April 20, 1955; Patent 2,763,278, issued September 18, 1956. Reference is here made to that patent for a disclosure of the details of the transmitter-receiver. Suffice it to say, that one of the transmitter-receivers shown in Fig. 2 comprises the parts within the line 4A (composed of dashes and dots). Transmitter-receiver 4A includes a first motor in a form of a Bourdon tube 30 connected through restriction 16 to a source or filtered air supply F.A.S. and through pipe 15 to movable valve conduit 14. This transmitter-receiver 4A also comprises a second motor in the form of a Bourdon tube 32 connected by a mechanical connection 33 to a handle or other manual actuator 3A. Second motor 32 is connected, at its stationary end, to pipe 310. At its movable end, second motor 32 carries a valve part 34 in the form of a flapper, which cooperates with a nozzle 35 in the form of a perforation in the free or movable end of first motor 30 or of a tube carried thereby.

In Fig. 2 there is provided a second transmitter-receiver analogous to the transmitter-receiver shown at 4 in Fig. 1. This second transmitter-receiver comprises the parts enclosed within the line 4B (composed of dashes and dots) and includes a first motor formed by a Bourdon tube 40 connected at its stationary end to restriction 18 and to movable valve conduit 17. Transmitter-receiver 4B also includes a second motor formed by a Bourdon tube 41. Conduit 42 connects the stationary end of motor 41 with stationary valve conduit 24; with the set point chamber 66 of the controller 6, which is marked in Fig. 2 with the legend "Set Point"; and with stationary valve conduit 23. A mechanical connection 44 connects handle 3B, which forms the manual actuator for transmitter-receiver 4B, to second motor 41. Second motor 41 carries on its free or movable end a small valve or flapper 41A which cooperates with a nozzle 40A formed in or carried by the free end of first motor 40.

OPERATION OF FIG. 2

Fig. 2 shows the circuit in the automatic position. When the measured variable sensed by the measuring element 5 is not changing, the controller 6 is in its normal, steady state and the pressure in the process variable chamber 65 equals the pressure in the set point chamber 66 (or is at some other predetermined ratio thereto) and the pressure in the positive feedback chamber 84 equals the pressure in the negative feedback chamber 81 (or is at some other predetermined ratio thereto). Consequently, the pressure in the output chamber 79 and in the output conduit 380 is not changing.

If the pressure sensed by the measuring element 5 changes, this change is transmitted through the pipe 20 to the process variable chamber 65 and causes the controller to operate in the manner already described so as to change the output pressure in the output chamber 79 to a corresponding extent. The output of controller 6 passes from output chamber 79 through conduit 380, movable valve conduit 13, and stationary valve conduit 11 to pipe 310. Pipe 310 connects with: (1) the motor 2 of the final control element 1; (2) the second motor 32 of the first transmitter-receiver 4A; and (3) the positive feedback pressure chamber 84 of the controller 6.

The pressure in motor 2 causes the final control element 1 to assume a position corresponding to the instantaneous value of the measured variable as sensed by the measuring element 5. The pressure in second motor 32 causes flapper 34 to assume a position with relation to nozzle 35 which causes first motor 30 to assume a position such that the pressure within first motor 30 is equal to the pressure within the second motor 32. This is possible because the handle 3A is not fastened to any fixed element but permits second motor 32 to move freely in response to the pressure within it. Therefore, the first motor 30 is always at a proper pressure to be connected to the motor 2 of the final control element 1, if it is desired to shift from automatic to manual control. The pressure in the positive feedback chamber 84 and in the negative feedback chamber 81 of the controller 6 acts to vary the output pressure of the controller until the positive and negative feedback pressures equalize.

The output pressure from the measuring instrument 5 is conducted through pipe 20 to the process variable pressure chamber 65 of controller 6. The pressure from restriction 18 passes to first motor 40 of second transmitter-receiver 4B, to set point pressure chamber 66 of controller 6, and to second motor 41 of transmitter-receiver 4B. The pressures within first motor 40 and second motor 41 are therefore equal.

Now, if manual actuator 8 for the transfer valve 7 is turned, so that the transfer valve moves from the automatic position marked A to the manual position marked M, there will be no change in pressure applied to the motor 2 for the final control element 1. The output of the controller 6 is cut off from the motor 2 for the final control element 1 by opening movable valve conduit 13, while the pressure of first motor 30 of first transmitter-receiver 4A is applied to the motor 2 for the final control element 1 through movable valve conduit 14. At the same time, the pressure of first motor 40 of second transmitter-receiver 4B is cut off from the set point chamber 66 by moving movable valve conduit 17 out of engagement with stationary valve conduit 23. Simultaneously, the output pressure of measuring element 5 is connected to second motor 41 of second transmitter-receiver 4B and to set point pressure chamber 66 of controller 6 by connecting movable valve conduit 19 into engagement with stationary valve conduit 24.

FIG. 3

Fig. 3 shows the apparatus in automatic position. In this modification, the transfer valve 7 has two parts. The first part 7A and the second part 7B are each enclosed in a line formed by dashes and dots. Parts 7A and 7B are operated in the following switching sequence: automatic position, marked A; seal 2 (S2) position, marked 52 and 57; seal 1 (S1) position, marked 52 and 55; and manual position, marked M. In transferring from manual to automatic the switching sequence is reversed from the sequence in transferring from automatic to manual.

The output of controller 6 is fed from output pressure chamber 79 through pipe 380 to stationary valve conduit 50 forming a part of the first part 7A of the transfer valve. First part 7A has a movable switch conduit 51, a stationary switch position 52 for the S1 and S2 positions, and a stationary switch conduit 53 for the manual position. Movable switch conduit 51 is connected by pipe 54 as follows: (1) to the positive feedback chamber 84 of the controller 6, which is marked "Positive Feed-back" in Fig. 3; (2) to stationary switch conduit 55 of second part 7B; (3) to the motor 2 for the final control element 1; and (4) to a pressure gauge 59, which indicates the pressure applied to the final control element 1. Second valve part 7B has (1) a stationary switch conduit 56 for automatic position; (2) a stationary switch conduit 57 for the S2 position; and (3) stationary switch conduit 55 for the S1 and M positions. A movable switch conduit 58 can be connected to each of these stationary switch conduits in sequence.

The modification of Fig. 3 employs but a single transmitter-receiver comprising the parts enclosed within the line formed by dots and dashes. Transmitter-receiver 4 comprises a first motor formed by a Bourdon tube 90 connected through a restriction 91 to a filtered air supply F.A.S. Transmitter-receiver 4 also includes a second motor formed by a Bourdon tube 92 connected at its stationary end by means of pipe 93 to movable valve conduit 58. Second motor 92 carries, at its free or movable end, a first valve part comprising a flapper 94. First motor 90 carries, at its free or movable end, a nozzle 95 formed by a perforation in or a perforated tube carried by Bourdon tube 90. The stationary end of first motor 90 is connected by a pipe 90: (1) to stationary valve conduit 53; (2) to set point pressure chamber 66 of controller 6, marked, in Fig. 3, "Set Point"; (3) to a pressure gauge 97, which indicates the set point pressure; and (4) to stationary valve conduit 56.

The measuring instrument 5, marked, in Fig. 3, "Automatic," is connected by pipe 98: (1) to a pressure gauge 99, which indicates the process variable pressure; (2) to process variable pressure chamber 65 of controller 6, and (3) to stationary valve conduit 57 of the second part 7B of the transfer valve.

The manual handle 3, which forms the operating element of the transmitter-receiver 4, is connected by a mechanical connection 300 to the second motor 92.

Manual actuator 8, which actuates the first part 7A and the second part 7B of the transfer valve, is connected by mechanical connection 100 to movable valve conduit 51 and by a mechanical connection 101 to movable valve conduit 58.

OPERATION OF FIG. 3

In the automatic position shown in Fig. 3 the output pressure of controller 6 is fed from chamber 79 through pipe 380, stationary valve conduit 50, movable valve 51, and pipe 54: (1) to positive feedback pressure chamber 84; (2) valve pressure indicator 59; and (3) the motor 2 for the final control element 1. The set point pressure in chamber 66 is fed through pipe 96: (1) to gauge 97, which indicates the set point pressure; (2) to first motor 90 of transmitter-receiver 4; and (3) through stationary valve conduit 56, movable valve conduit 58, and pipe 93, to second motor 92 of transmitter-receiver 4. Second motor 92 of transmitter-receiver 4, by means of flapper 94 and movable valve conduit position nozzle 95, causes the pressure in first motor 90 to equal that in second motor 92.

In order to switch from automatic position toward manual position, manual actuator 8 for transfer valve 7A and 7B is turned so that movable valve conduits 51 and 58 disengage stationary valve conduits 50 and 56, respectively, and engage stationary valve conduits 52 and 57, respectively. This is the S2 position, in which, the output pressure of the measuring instrument 5 is fed through pipe 98, stationary valve conduit 57, movable valve conduit 58, and pipe 93, to second motor 92 of transmitter-receiver 4. The pressure in second motor 92, by means of flapper 94 and nozzle 95, causes the pressure in first motor 90 to equal the pressure in second motor 92. Simultaneously, the output pressure from controller 6 is cut off from the final control element 1 because movable valve conduit 51 is moved out of engagement with stationary valve conduit 50 and into movable valve conduit position 52. Manual actuator 8 is again turned, leaving movable valve conduit 51 in engagement with movable valve conduit position 52 but moving movable valve conduit 58 out of engagement with stationary valve conduit 57 and into engagement with stationary valve conduit 55. This causes the pressure applied to final control element 1 to be transmitted by means of pipe 54, stationary valve conduit 55, movable valve conduit 58, and pipe 93, to second motor 92. The pressure in second motor 92 causes the pressure in first motor 91 to equal it. Manual actuator 8 may then be turned a third time, leaving movable valve conduit 58 in engagement with stationary valve conduit 55 but moving movable valve conduit 51 out of movable valve conduit position 52 and into engagement with stationary valve conduit 53. This causes the pressure in second motor 92 to be applied through pipe 58, movable valve conduit 58, stationary valve conduit 55 and pipe 54 to the motor 2 for the final control element 1; to pressure gauge 59, and to the positive feedback chamber 84 of the controller 6.

FIG. 4

Fig. 4 shows a modification in which there is employed a single transmitter-receiver 4 and a transfer valve having four parts 1A, 2A, 3A, and 4A. There is shown in the following table, the position which each of the parts 1A, 2A, 3A, and 4A assumes in each of the four positions, which the transfer valve 7 may take. The transfer valve 7 may be operated in the following sequence of positions: Automatic, Matching-Automatic, Matching-Manual, and Manual, or the reverse.

*Table of transfer valve positions*

SEQUENCE OF OPERATION

[Legend: Closed=X; Open=O.]

Position

| Part | Automatic | Matching Automatic | Matching Manual | Manual |
|---|---|---|---|---|
| 1A | O | Unchanged | Unchanged | X |
| 2A | X | X | O | O |
| 3A | O | X | X | O |
| 4A | X | O | X | X |

Fig. 4 shows the device in the automatic position. In this position, the output of controller 6 is fed from output chamber 79 through pipe 380, part 1A, and pipe 200 to the motor for the final control element 1. Pipe 200 also connects to one side of part 2A.

A filtered air supply F.A.S. is connected through a restriction 201 to the nozzle 202 mounted on the free end of first motor 203 forming part of a transmitter-receiver. The stationary end of first motor 203 is connected by pipe 204 to one side of part 3A; to the output of relay 211; and to the set point chamber 66 of controller 6, marked "Set Point," in Fig. 4. The second motor 205 of the transmitter-receiver carries, at its free or movable end, a flapper 206 cooperating with nozzle 202. The stationary end of second motor 205 is connected to the opposite side of part 3A and, by means of pipe 207, to parts 2A and 4A. The output pressure from the measuring instrument 5, marked Automatic in Fig. 4, is connected, by means of pipe 208, to the process variable pressure chamber 65 of the controller 6 and to the opposite side of part 4A. The manual actuator 8 for the transfer valve comprised by the four parts 1A, 2A, 3A, and 4A is connected to these parts by a mechanical connection 209. The manual handle 3 is connected by a mechanical connection 210 to a second motor 205.

It is believed that the connections between the various elements of the circuit and the way in which these connections are varied as the control of the final control element 1 is shifted from the automatic position, in which the final control element 1 is under the control of measuring instrument 5, through the matching-automatic position and the matching-manual position to the manual position, in which the final control element 1 is under the control of the manual handle 3, can best be seen from the above table of transfer valve positions, and that this sequence of operations and change of connections need not be set forth in detail here.

From such a survey of the above table, it will be seen that, in the automatic position, the pressure in first motor 203 equalizes with the pressure in second motor 205 through part 3A, which is open. In matching-automatic position, part 3A is closed and part 4A is opened, so as to apply the output pressure from measuring instrument 5 to second motor 205. Since the pressure in first motor 203 follows the pressure in second motor 205, because of the action of flapper 206 and nozzle 202, the pressure in first motor 203 equalizes with the output pressure of measuring instrument 5. In matching-manual position, part 4A is closed and the pressure from measuring instrument 5 is cut off from second motor 205 while, simultaneously, part 2A is opened and the pressure in second motor 205 is applied to the motor 2 for the final control element 1. This does not cause any disturbance to the process under the control of final control element 1 because the pressure from controller 6 and from second motor 205 are the same. In manual position, the pressure from controller 6 is cut off from the motor for the final control element 1, leaving final control element 1 under the control of second motor 205 and first motor 203 because part 3A between the two motors is now open.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is as follows:

1. In an air-pressure-operated automatically or manually actuated circuit for operating a final control element, means for shifting automatically between automatic or manual operation without disturbing the value of the air pressure being impressed on the final control element at the time of the shift, said means including, a controller having separate interacting pressure-responsive chambers therein, one of said chambers being a process variable chamber responsive to a pressure representing the instantaneous value of the process variable, another of said chambers being a set point chamber responsive to a pressure representing that value of the process variable which it is desired that said controller maintain, another of said chambers being a feed back chamber, and another of said chambers providing the output pressure of the controller, a manually-operable transmitter-receiver, a first air-pressure-operated motor in said transmitter-receiver adapted for connection to a supply of air under pressure, a second air-pressure-operated motor in said transmitter-receiver, a handle engaging said second motor and manually operable to move said second motor, a valve having a first part connected to said first motor and a second part connected to said second motor and operable so that relative movement between said first and second motors varies the value of the air pressure being impressed on said first motor from said source and causes said first motor to follow the movements of said second motor, and a manually operable transfer valve having a first part connected to the air pressure being impressed on the final control element and operable to connect said pressure to the output pressure from controller or to said first motor and having a second part connected to said second motor and operable to connect the air pressure being impresesd on said second motor to the set point chamber of said controller and to said first motor or to the feed back chamber of said controller and to the final control element.

2. In an air-pressure-operated automatically or manually actuated circuit for operating a final control element, means for shifting automatically between automatic or manual operation without disturbing the value of the air pressure being impressed on the final control element at the time of the shift, said means including, a controller having separate interacting pressure-responsive chambers therein, one of said chambers being a process variable chamber responsive to a pressure representing the instantaneous value of the process variable, another of said chambers being a set point chamber responsive to a pressure representing that value of the process variable which it is desired that said controller maintain, another of said chambers being a feedback chamber, and another of said chambers providing the output pressure of the controller, first and second manually-operable transmitter-receivers, each having a first air-pressure-operated motor therein adapted for connection to a supply of fluid under pressure, each having a second air-pressure-operated motor therein, a pair of handles each engaging one of said second motors so as to operate it, a pair of valves each interconnected between one of said first motors and one of said second motors and operable upon relative movement between said first motor and said second motor to vary the pressure of the air impressed on said first motor and thereby cause said first motor to follow the movements of said second motor, a first manually operable transfer valve having a part connected to the air pressure impressed on the final control valve and to said feedback chamber of said controller and to said second motor of said first transmitter-receiver and manually operable to connect said pressure to the output pressure from said controller or to said first motor of said first transmitter-receiver, and a second manually operable transfer valve having a part connected to said second motor of said second transmitter-receiver and to said set point chamber of said controller and manually operable to connect with said first motor of said second transmitter-receiver or with the air pressure being impressed on said process variable chamber of said controller.

3. In an air-pressure-operated automatically or manually actuated circuit for operating a final control element, means for shifting automatically between automatic or manual operation without disturbing the value of the air pressure being impressed on the final control element at the time of the shift, said means including, a controller having separate interacting pressure-responsive chambers therein, one of said chambers being a process variable chamber responsive to a pressure representing the instantaneous value of the process variable, another of said chambers being a set point chamber responsive to a pressure representing that value of the process variable which it is desired that said controller maintain, another of said chambers being a feed back chamber, and another of said chambers providing the output pressure of the controller, a manually-operable transmitter-receiver, a first air-pressure-operated motor in said transmitter-receiver adapted for connection to a supply of air under pressure, a second air-pressure-operated motor in said transmitter-receiver, a valve having a first part connected to said first motor and a second part connected to said second motor and operable so that relative movement between said first and second motors varies the value of the air pressure being impressed on said first motor from said source and causes said first motor to follow the movements of said second motor, and a manually operable transfer valve having four positions and four parts, said positions including: automatic position, in which part 1 is open and connects the output pressure from said controller to the final control element, part 2 is closed, part 3 is open and connects said first and second motors, and part 4 is closed; matching-automatic position, in which parts 2 and 3 are closed, and part 4 is open and connects the process variable pressure to said second motor; matching-manual position, in which part 2 is open and connects the pressure being impressed on the final control element to said second motor and parts 3 and 4 are closed; and manual position, in which part 1 is closed, part 2 is open and connects the pressure being impressed on the final control element to said second motor, part 3 is open and connects said first and second motors, and part 4 is closed.

References Cited in the file of this patent

UNITED STATES PATENTS

| | | |
|---|---|---|
| 2,517,051 | Swenson | Aug. 1, 1950 |
| 2,588,799 | Booth | Mar. 11, 1952 |
| 2,638,117 | Horn | May 12, 1953 |
| 2,658,516 | Luppold | Nov. 10, 1953 |
| 2,731,023 | Panich | Jan. 17, 1956 |
| 2,743,710 | Shannon | May 1, 1956 |
| 2,747,595 | Dickey | May 29, 1956 |
| 2,763,278 | Eller et al. | Sept. 18, 1956 |
| 2,834,362 | Gorrie | May 13, 1958 |
| 2,851,047 | Eller | Sept. 9, 1958 |
| 2,863,470 | McChesney | Dec. 9, 1958 |
| 2,884,939 | Eller | May 5, 1959 |